(12) United States Patent
Cho et al.

(10) Patent No.: US 7,869,693 B2
(45) Date of Patent: Jan. 11, 2011

(54) METHOD AND APPARATUS OF RECORDING DIGITAL DATA STREAM, AND A RECORDING MEDIUM CONTAINING DATA RECORDED THROUGH SAID METHOD

(75) Inventors: Jang Hui Cho, Seoul (KR); Jea Yong Yoo, Seoul (KR); Kang Soo Seo, Kyunggi-do (KR); Byung Jin Kim, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 1324 days.

(21) Appl. No.: 10/172,798

(22) Filed: Jun. 14, 2002

(65) Prior Publication Data
US 2002/0191115 A1 Dec. 19, 2002

(30) Foreign Application Priority Data
Jun. 15, 2001 (KR) .......................... 2001-0034009

(51) Int. Cl.
H04N 5/84 (2006.01)
(52) U.S. Cl. ...................................... 386/124; 386/126
(58) Field of Classification Search .................. 386/33, 386/45, 111, 112, 125, 126, 124, 131; 348/441; 370/466
See application file for complete search history.

(56) References Cited

U.S. PATENT DOCUMENTS

| | | | |
|---|---|---|---|
| 5,377,051 A | 12/1994 | Lane et al. | |
| 5,517,250 A | 5/1996 | Hoogenboom et al. | |
| 5,535,008 A | 7/1996 | Yamagishi et al. | |
| 5,719,982 A | 2/1998 | Kawamura et al. | |
| 5,801,781 A * | 9/1998 | Hiroshima et al. | 348/441 |
| 5,818,547 A | 10/1998 | Ozaki | |
| 5,832,085 A * | 11/1998 | Inoue et al. | 386/124 |

(Continued)

FOREIGN PATENT DOCUMENTS

CN 1221284 6/1999

(Continued)

OTHER PUBLICATIONS

Office Action for counterpart U.S. Appl. No. 11/001,172 dated Sep. 12, 2008.

(Continued)

*Primary Examiner*—David E Harvey
(74) *Attorney, Agent, or Firm*—Harness, Dickey & Pierce, P.L.C.

(57) ABSTRACT

The present invention relates to method and apparatus of recording digital data stream on a recording medium such as a high-density digital versatile disk. The present recording method searches received digital data stream containing video signals for each picture section, packetizes a data section including at least one picture section found in the searching process into a PES (Packetized Elementary Stream) packet, slices the PES packet to make the sliced data pieces to a plurality of transport packets, and writes the plurality of transport packets within a stream object unit if the stream object unit has a space enough to store the plurality of transport packets, or from head point of a next stream object unit if not. Therefore, the head of each stream object unit is aligned with start of an arbitrary picture, thereby improving random accessibility of A/V data stream recorded on a recording medium.

17 Claims, 2 Drawing Sheets

U.S. PATENT DOCUMENTS

| | | | |
|---|---|---|---|
| 5,850,501 A | 12/1998 | Yanagihara | |
| 6,021,168 A | 2/2000 | Huh | |
| 6,118,486 A | 9/2000 | Reitmeier | |
| 6,169,843 B1 | 1/2001 | Lenihan et al. | |
| 6,181,872 B1* | 1/2001 | Yamane et al. | 386/112 |
| 6,211,800 B1 | 4/2001 | Yanagihara et al. | |
| 6,285,825 B1* | 9/2001 | Miwa et al. | 386/98 |
| 6,373,856 B1 | 4/2002 | Higashida | |
| 6,460,097 B1 | 10/2002 | Harumoto et al. | |
| 6,467,093 B1 | 10/2002 | Inoue et al. | |
| 6,567,409 B1* | 5/2003 | Tozaki et al. | 370/395.64 |
| 6,580,869 B1* | 6/2003 | Ando et al. | 386/125 |
| 6,618,549 B1 | 9/2003 | Kato et al. | |
| 6,754,273 B1 | 6/2004 | Sackstein et al. | |
| 6,782,189 B2 | 8/2004 | Ando et al. | |
| 6,792,198 B1* | 9/2004 | Kim et al. | 386/111 |
| 6,823,010 B1 | 11/2004 | Curet et al. | |
| 6,865,747 B1 | 3/2005 | Mercier | |
| 6,901,078 B2* | 5/2005 | Morris | 370/466 |
| 6,920,178 B1* | 7/2005 | Curet et al. | 375/240.14 |
| 7,088,911 B2* | 8/2006 | Himeno et al. | 386/125 |
| 7,106,749 B1* | 9/2006 | Darshan et al. | 370/395.64 |
| 2001/0026561 A1* | 10/2001 | Morris et al. | 370/487 |
| 2002/0016970 A1 | 2/2002 | Negishi et al. | |
| 2002/0018643 A1* | 2/2002 | Okada et al. | 386/95 |
| 2002/0118953 A1 | 8/2002 | Kim | |
| 2003/0043847 A1* | 3/2003 | Haddad | 370/473 |
| 2003/0133699 A1* | 7/2003 | Ando et al. | 386/95 |
| 2003/0189879 A1 | 10/2003 | Ishii et al. | |
| 2004/0081435 A1 | 4/2004 | Maehashi et al. | |
| 2005/0259946 A1* | 11/2005 | Kitamura | 386/46 |

FOREIGN PATENT DOCUMENTS

| | | |
|---|---|---|
| CN | 1222735 | 7/1999 |
| EP | 0 917 355 A1 | 5/1999 |
| EP | 0863669 | 11/2001 |
| JP | 06-178288 | 6/1994 |
| JP | 08-140043 | 5/1996 |
| JP | 11-045512 | 2/1999 |
| JP | 11-261963 | 9/1999 |
| KR | 1998-40115 | 8/1998 |
| KR | 10-0252108 | 1/2000 |
| KR | 000026049 A | 5/2000 |
| WO | WO 98/40889 | 9/1998 |
| WO | WO 00/30358 | 5/2000 |
| WO | WO 01/20826 A1 | 3/2001 |

OTHER PUBLICATIONS

Office Action for counterpart U.S. Appl. No. 11/001,172 dated Mar. 2, 2010.

\* cited by examiner

METHOD AND APPARATUS OF RECORDING DIGITAL DATA STREAM, AND A RECORDING MEDIUM CONTAINING DATA RECORDED THROUGH SAID METHOD

CROSS-REFERENCE TO RELATED APPLICATIONS

Pursuant to 35 U.S.C. §119(a), this application claims the benefit of earlier filing date and right of priority to Korean Application No. 2001-34009, filed on Jun. 15, 2001, the contents of which are hereby incorporated by reference herein in their entirety.

BACKGROUND OF THE INVENTION

1. Field of the Invention

The present invention relates to method and apparatus of recording digital data stream on a recording medium such as a high-density digital versatile disk (called 'HD-DVD' hereinafter).

The present invention further relates a recording medium on which digital data stream has been written in accordance with said method.

2. Description of the Related Art

Owing to technical improvement in the fields of video/audio data compression, digital modulation/demodulation, and so on, a digital television broadcast system broadcasting TV signals in the form of digital data stream is being standardized rapidly.

In the digital television broadcast system, audio/video (A/V) signals to be broadcasted are compressed according to the data compressing rule specified by MPEG 2 (Moving Picture Experts Group) and the compressed A/V data are broadcasted in the form of transport stream (TS), which is also defined in MPEG 2 standard, composed of series of 188-byte-long transport packets (TPs).

The digital TV broadcast system, which will be commercialized soon owing to technical improvement of A/V data compression and transmission, is able to support much higher-quality of video and audio than analog TV system. Furthermore, it ensures data compatibility with a digital communication device, a digital storage device, etc.

In the meantime, a new device is being developed to prepare for commercialization of digital TV broadcast system. That is a digital recorder being able to receive TS of digital broadcast programs and record it on a writable HD-DVD. Such a digital recorder will be widely used as the digital TV broadcast system is commercialized in earnest.

Digital A/V data compressed in the manner of MPEG 2 for the digital TV broadcast system are composed of I-(Intra-), P-(Predictive-), and B-(Bidirectionally predictive-) pictures. An I picture is a basic one and a P or a B picture can be presented as a video frame if there is an associated I picture.

In the digital TV broadcast system, the compressed digital A/V data are divided to insert in each payload field of series of 188-byte-long (inclusive of header) TPs which are broadcasted sequentially.

Then, the digital recorder would record the TPs carrying TV broadcast programs on a writable HD-DVD in the same order as they are received. During the recording operation, a predetermined-sized, e.g., 4-byte time stamp indicative of packet arrival time may be added to each TP.

If the recorded TPs reaches some packs, e.g., 32 packs during the TP recording, the digital recorder groups those packs into a single 'high-density stream object unit' (called 'HOBU' hereinafter) and creates and writes search information for that HOBU as navigation data. The search information includes location or location-associated time information pointing to the head of a HOBU.

However, if the broadcasted TPs are recorded in the same order as they are received as aforementioned, the head of each HOBU is not aligned with the start of an arbitrary picture as shown in FIG. 1. In case that digital data stream has been recorded as shown in FIG. 1, when the digital recorder searches the recorded digital data stream for a certain scene equivalent to a picture a user wants to view, it searches as jumping in the unit of HOBU with reference to the stored search information for all HOBUs.

However, because a HOBU includes the rest data of a previous picture in its head area as shown in FIG. 1, a complete video frame can not be constructed from the data in the head area. Therefore, the digital recorder must discard the rest data of a previous picture in the current HOBU and obtain a complete picture data from successive TPs following the discard data. After the obtained complete picture data are presented as a video frame, the digital recorder may confirm whether or not reproduction is to be started from the presented picture based on user's command, e.g., 'continue searching' or 'play'.

However, the additional searching operation within a HOBU for a complete picture takes more searching time. Namely, it makes worse random accessibility of recorded digital data stream.

If the rest data of a previous picture are outputted not discarding, noise might be generated in a video frame.

Consequently, if digital data stream of digital TV broadcast programs are recorded as they received, the aforementioned disadvantages would arise inevitably.

On the other hand, if a read-only HD-DVD containing A/V digital data stream to be presented through a digital television set is manufactured, without any consideration of alignment of the head of each HOBU with picture start, in the manner that digital data stream is divided and filled in each payload field of successive TPs with which HOBUs are packed, as illustrated in FIG. 1, then, such-manufactured read-only HD-DVD would still have the aforementioned drawbacks such as bad random-accessibility.

SUMMARY OF THE INVENTION

It is an object of the present invention to provide digital data stream recording method and apparatus which packs a new HOBU with data of an arbitrary complete picture from its head point while recording the digital data stream on a recording medium as grouping predetermined size among the recorded digital data stream to a HOBU.

It is another object of the present invention to provide a recording medium in which digital data stream recorded thereon are grouped to a plurality of HOBUs each of which contains data of an arbitrary complete picture from its head point.

A method of recording digital data stream on a recording medium in accordance with the present invention is characterized in that it comprises the steps of searching digital data stream containing video signals for each picture section; packetizing a data section including at least one picture section found in said searching step into a first-typed packet; and slicing the first-typed packet to make the sliced data pieces to a plurality of second-typed packets, and writing the plurality of second-typed packets within a stream object unit if the stream object unit has a space enough to store the plurality of second-typed packets, or from head point of a next stream object unit if not.

An apparatus of recording digital data stream on a recording medium in accordance with the present invention is characterized in that it comprises: a first packetizer searching digital data stream containing video signals for each picture section and packetizing a data section including at least one among found picture sections into a first-typed packet; a second packetizer slicing the first-typed packet made by said first packetizer to make the sliced data pieces to a plurality of second-typed packets; and a data writer writing the plurality of second-typed packets made from the first-typed packet by said second packetizer within a stream object unit if the stream object unit has a space enough to store the plurality of second-typed packets, or from head point of a next stream object unit if not, wherein data of every second-typed packet are converted to writing suitable format by said data writer before written on a recording medium.

A recording medium in accordance with the present invention is characterized in that it includes data recorded thereon are grouped into a plurality of stream object units, wherein the stream object unit begins with start data of a picture equivalent to a video frame.

BRIEF DESCRIPTION OF THE DRAWINGS

The accompanying drawings, which are included to provide a further understandings of the invention, illustrate the preferred embodiments of the invention, and together with the description, serve to explain the principles of the present invention.

DETAILED DESCRIPTION OF THE PREFERRED EMBODIMENT

In order that the invention may be fully understood, a preferred embodiment thereof will now be described with reference to the accompanying drawings.

Figure 1:
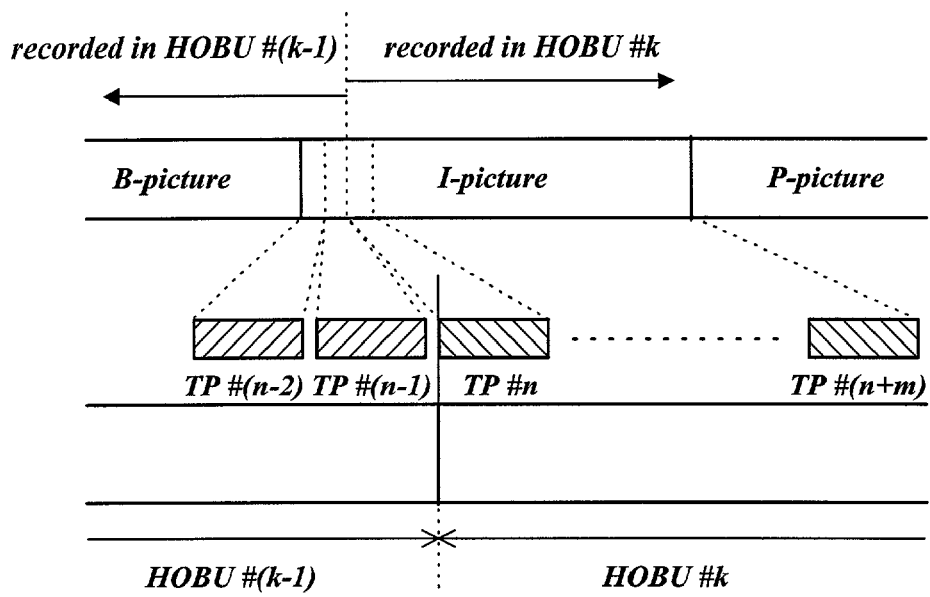
FIG. 1 shows an example of data format formed by a conventional recording method in which transport stream is recorded as received.
Figure 2:
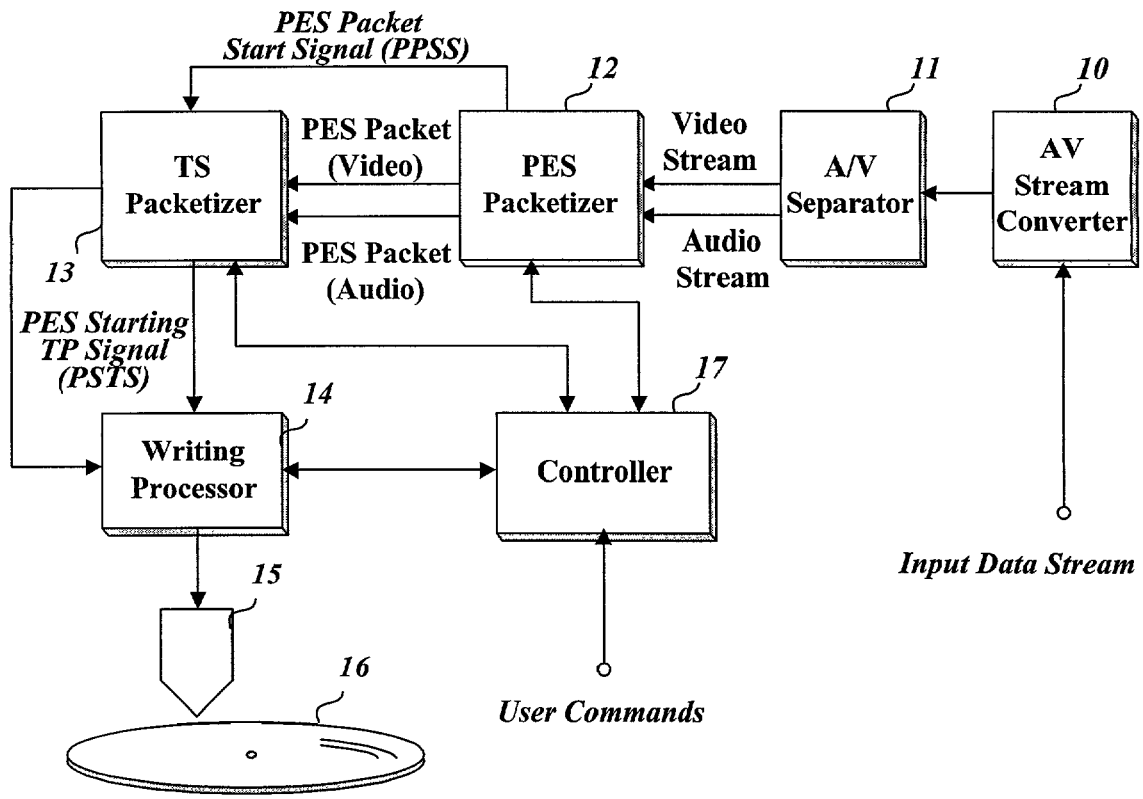
FIG. 2 is a block diagram of an embodiment of a digital recorder recording digital data stream on a writable medium in accordance with the present invention.

FIG. 2 is a block diagram of an embodiment of a digital recorder recording digital data stream on a writable medium in accordance with the present invention.

The digital recorder of FIG. 2, which may be a video disk recorder (called 'VDR') being able to write digital A/V data on a writable HD-DVD, comprises an A/V stream converter 10 converting received A/V signal to A/V data stream compressed according to MPEG 2 standard; an A/V stream separator 11 separating the compressed A/V data stream into audio and video stream; a PES packetizer 12 packetizing the audio and the video stream into PES (Packetized Elementary Stream) packets defined in MPEG 2 standard, respectively; a TS packetizer 13 slicing the video and the audio PES packets, respectively, to make respective series of TPs, and multiplexing the respective series of video and audio TPs into a single TS; a writing processor 14 re-formatting the TS from the TS packetizer 13 to record/reproduction suitable structure and outputting disk writing signals corresponding to re-formatted data; an optical pickup 15 forming marks and spaces along a track of an inserted writable HD-DVD according to the disk writing signals; and a controller 17 receiving information on data size being written, creating search information based on the received information, and writing all of the created search information on the writable HD-DVD 16 through the writing processor 14.

The A/V stream converter 10, if a digital TV broadcast program formatted in TS is received, extracts compressed A/V data stream from the TS through decoding successive TPs. However, if non-MPEG formatted program stream broadcasted by other standard of digital TV broadcast system, e.g., DirecTV is received, the A/V stream converter 10 conducts decoding algorithm suitable to that system to extract A/V data, and compresses the extracted A/V data again according to data compressing rule of MPEG 2 standard. If an analog A/V signal is received, the A/V stream converter 10 digitizes audio and video signal, respectively, and conducts MPEG 2 compressing operation for the respective digitized signal.

Figure 3:
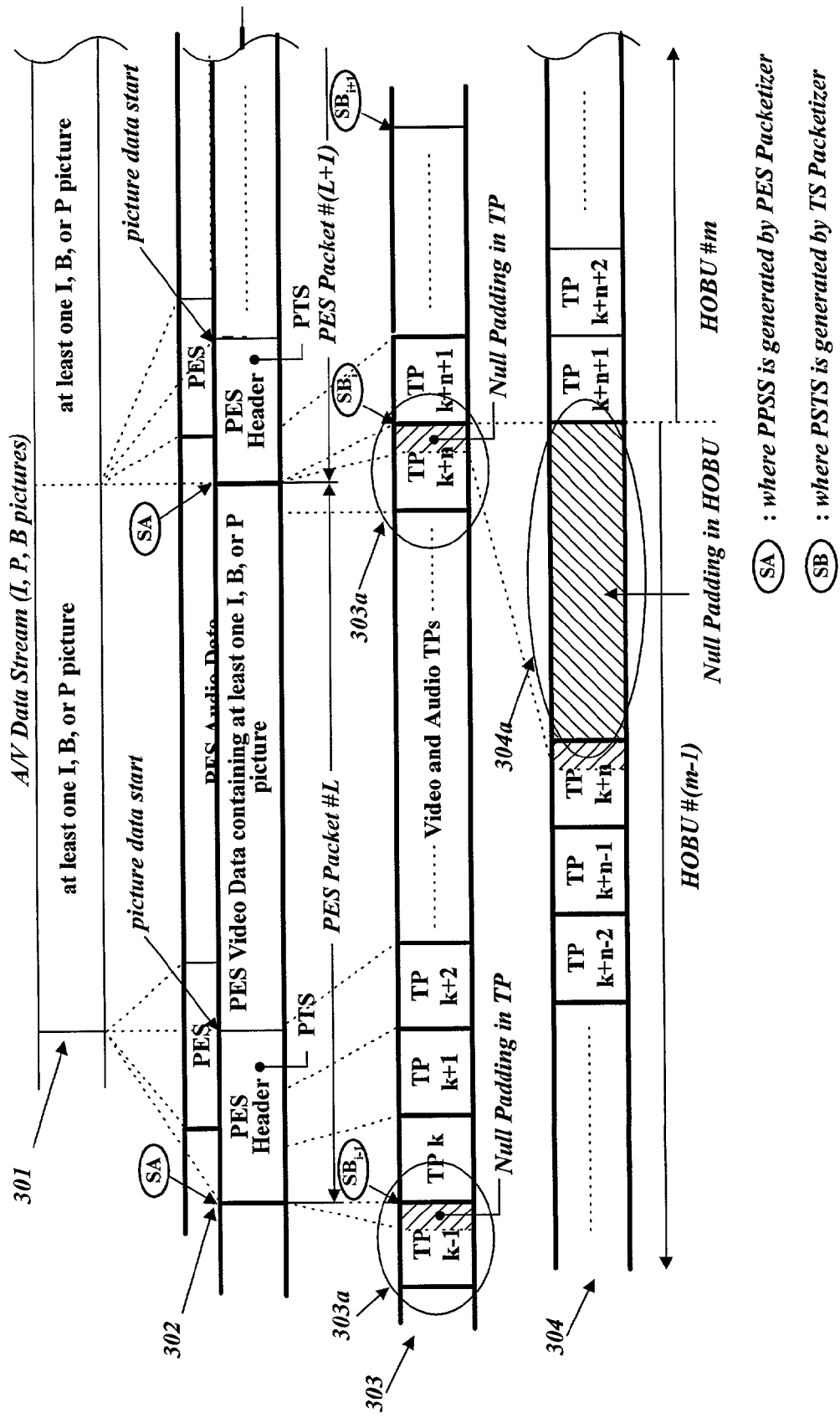
FIG. 3 shows a schematic process of recording received A/V data stream in accordance with the present invention.

FIG. 3 shows a schematic process of recording received A/V data stream in accordance with the present invention.

A received data stream of an arbitrary format is converted to MPEG 2-compressed data stream 301 by the A/V stream converter 10. Then, the PES packetizer 12 at the next stage analyzes video stream of the A/V data stream 301 to search for every I-, P-, and B-picture section, and composes a PES packet with at least one picture section. The PES packetizer 12 also composes a PES packet with audio data stream of each frame group.

At this time, a PES header is added at the front of each PES packet to form a complete PES packet. A Presentation Time Stamp (PTS) for a picture included in a PES packet is written in a PES header thereof. A Decoding Time Stamp (DTS) for an included picture is optionally written in a PES header.

Through the above operations, the PES packetizer 12 outputs a data stream 302 shown in FIG. 3.

When the PES packetizer 12 transmits the composed data stream 302 to the TS packetizer 13, it also sends a 'PES packet start signal' (PPSS) indicative of transmission of start data of a video PES packet, in the strict sense, PES header of a video PES packet to the TS packetizer 13. The TS packetizer 13 slices the video and the audio PES packets, respectively, to make two series of video and audio TPs, and multiplexes the video and the audio TPs into a single TS 303 which is depicted in FIG. 3.

If the PPSS is received from the PES packetizer 12 while making TPs from received data, the TS packetizer 13 starts to insert just-received data in payload field of the next video TP, namely, it creates a new TP and writes data received concurrently with the PPSS in the created new TP. If a current video TP is not fully filled with received data at the time when the PPSS is received, its remaining area is padded with null data. The elliptic zones 303a in FIG. 3 show partially null-padded TPs through the above operations of the TS packetizer 13.

The TS packetizer 13 delivers TPs to the writing processor 14 in the same order as they are multiplexed. If a TP being delivered at present contains start data of a sliced PES packet, then the TS packetizer 13 notifies the writing processor 14 of that fact by sending PES starting TP signal (PSTS) concurrently to the writing processor 14.

The writing processor 14 gathers the received TPs. Whenever the PSTS is received from the TS packetizer 13, the writing processor 14 checks whether or not TPs gathered until now are larger than the size of a single HOBU, a grouping unit of the writable HD-DVD 16. If not greater, the writing processor 14 only memorizes the location, e.g., '$SB_i$' of a TP received at the same time as the PSTS, and continues to gather the TPs received thereafter. If greater, for example, if current case is at '$SB_{i+1}$', the writing processor 14 re-formats the gathered TPs excluding back TPs placed from a previously-memorized position 'SB$_i$' to form writing data group for a single HOBU, and modulates and outputs the formed writing data group.

The size of writing data group formed for a single HOBU is less than the capacity of a single HOBU because of the exclusion of back TPs which would cause, if included in the writing data group, the whole gathered TPs to exceed the capacity of a HOBU. Therefore, the writing processor 14 generates additional null data of which size is equal to the remaining capacity of a HOBU. The generated null data follows the outputted writing data group and are written in the remaining area of the HOBU. The null data padded in the HOBU are sure to prevent possible reproducing or decoding errors.

Next successive TPs are gathered to the remaining TPs not included in the formed writing data group for a HOBU, namely, TPs existing from the previously-memorized position 'SB$_i$' to the just-received position 'SB$_{i+1}$' and the latest TP received concurrently with the PSTS, and they will be written in the next HOBU when the gathered size is greater than the capacity of a single HOBU. Consequently, the next HOBU will also begin with start data of a picture, in the strict sense, header of a PES packet of which data field begins with start data of a picture.

The modulated signals outputted from the writing processor 14 are written in the form of marks and spaces on the writable HD-DVD 16 through the optical pickup 15.

In the meantime, after forming the writing data group for a single HOBU, the writing processor 14 informs the controller 17 of the writing data group formation for a single HOBU and the number of the PSTSs received until the writing data group formation.

On the other hand, the controller 17 continuously receives and stores PTSs written in the PES header of each PES packet by the PES packetizer 12. Thus, if the writing data group formation for a single HOBU is informed along with the number of the PSTSs, the controller 17 calculates a PTS time length of the present writing data group formed for a single HOBU based on the stored PTSs of every PES packet to create search information for that HOBU. The search information may include PTS time length of each HOBU and accumulated PTS time length up to each HOBU (it need not size information and accumulated size information of each HOBU if the size of a HOBU is constant). The search information will be created for each HOBU-sized data, and it is transmitted to the writing processor 14 to be written on a pre-assigned area as navigation data in the middle of A/V data recording operation or after A/V data recording is done.

According to the explained writing operation of the writing processor 14, the received A/V data stream forms a data written format 304 on the writable HD-DVD 16 as shown in FIG. 3.

In other words, the head of each HOBU is aligned with the start data of a PES packet, namely, the start of an arbitrary picture.

Therefore, when the controller 17, in search mode, identifies a certain HOBU using the navigation data and accesses the identified HOBU, an additional minute searching operation for a picture start is not necessary because the start of the identified HOBU is exactly a picture start.

The above-explained data stream recording format 304 of FIG. 3 is applicable to a read-only HD-DVD which stores A/V data stream in the form of pre-pits. Namely, A/V data stream is formed on a read-only HD-DVD in the manner that each HOBU begins with picture start data. In addition, search information for each HOBU is recorded in a navigation data area or as a navigation data file.

Needless to say, an additional minute searching operation in a HOBU for a picture start is removed for a such-manufactured read-only HD-DVD.

On the other hand, when A/V data stream is written on a conventional read-only DVD, it is packetized into PES packets in the manner that one PES packet is written in one sector.

However, in the present A/V stream recording method, a stream section including at least one picture, of which size is quite larger than that of a sector of a conventional read-only DVD, is packetized into one PES packet. Therefore, the number of PES headers added to each PES packet is reduced considerably in comparison with the A/V data stream recording scheme conducted for a conventional read-only DVD.

The above-explained A/V data stream recording method and apparatus, and a recording medium in which A/V data stream has been recorded through said method can improve random accessibility of recorded A/V data stream and increase the actual data recording efficiency of a high-density recording medium in comparison with recording format of a conventional read-only DVD.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of creating a data structure for recording a digital data stream using a recorder, the method comprising:
    packetizing with a packetizer portion of the recorder the digital data stream to form a plurality of Packetized Elementary Stream (PES) packets;
    slicing the PES packets to form transport packets, each transport packet having a fixed size;
    combining the transport packets into a plurality of data units, start data of each of the PES packets being included in first portions of the units respectively; and
    filling a data unit not completely filled with transport packets with one or more null data packets such that the data unit has a fixed size.

2. The method of claim 1, further comprising recording the data units on a recording medium.

3. The method of claim 1, wherein the first portion of each data unit includes a first portion of data for a picture.

4. The method of claim 1, wherein the one or more null data packets are added at an end of the data unit.

5. An apparatus for creating a data structure for recording a digital data stream, the apparatus comprising:
    a first packetizing unit configured to packetize the digital data stream to form a plurality of Packetized Elementary Stream (PES) packets;
    a second packetizing unit configured to slice the PES packets to form transport packets;
    a processor configured to combine the transport packets into a plurality of data units; and
    a controller configured to control the second packetizing unit such that each transport packet has a fixed size, control the processor to add one or more null data packets to any data unit not completely filled with packets such that each data unit has a fixed size, and control the processor such that start data of each of the PES packets is included in first portions of the data units respectively.

6. The apparatus of claim 5, further comprising a data writing unit configured to record the data units on a recording medium.

7. The apparatus of claim 5, wherein the controller is further configured to control the processor such that the first portion of each data unit includes a first portion of data for a picture.

8. The apparatus of claim 5, wherein the controller is further configured to control the processor to add the one or more null data packets at an end of the data unit.

9. A method of recording a digital data stream using a recorder, the method comprising:

packetizing with a packetizer portion of the recorder the digital data stream to form a plurality of Packetized Elementary Stream (PES) packets;

slicing the PES packets to form transport packets, each transport packet having a fixed size;

combining the transport packets into data units, start data of each PES packet being included in first portions of the units;

filling any data unit not completely filled with packets with one or more null data packets such that the data unit has a fixed size; and recording the data unit on a recording medium.

10. The method of claim 9, wherein the first portion of each data unit includes a first portion of data for a picture.

11. The method of claim 9, wherein the one or more null data packets are added at an end of the data unit.

12. An apparatus for recording a digital data stream, comprising:

a first packetizing unit configured to packetize the digital data stream to form a plurality of Packetized Elementary Stream (PES) packets;

a second packetizing unit configured to slice the PES packet to form transport packets;

a processor configured to combine the transport packets into data units;

a controller configured to control the second packetizing unit such that each transport packet has a fixed size, control the processor to add one or more null data packet to any data unit not completely filled with packets such that the data unit has a fixed size, and control the processor such that start data of each of the PES packets being included in start portions of the data unit respectively; and a pickup unit configured to record the data unit on a recording medium.

13. The apparatus of claim 12, wherein the controller is further configured to control the processor such that the first portion of the data unit includes a first portion of data for a picture.

14. The apparatus of claim 12, wherein the controller is further configured to control the processor to add the one or more null data packets at an end of the data unit.

15. A recording medium having a data structure to be read by an apparatus for reproducing data, comprising:

a recording area storing a transport stream being formed of a plurality of transport packets, the transport packets representing a plurality of Packetized Elementary Stream (PES) packets defined in MPEG 2 standard, the transport packets being grouped into data units of a fixed number of transport packets, start data of each PES packet being included in first portions of the data units respectively, the data unit being filled with one or more null data packets such that the unit has a fixed size.

16. The recording medium of claim 15, wherein the first portion of each data unit includes a first portion of data for a picture.

17. The recording medium of claim 15, wherein the one or more null data packet is added at an end of the data unit.

\* \* \* \* \*